Figure 10:
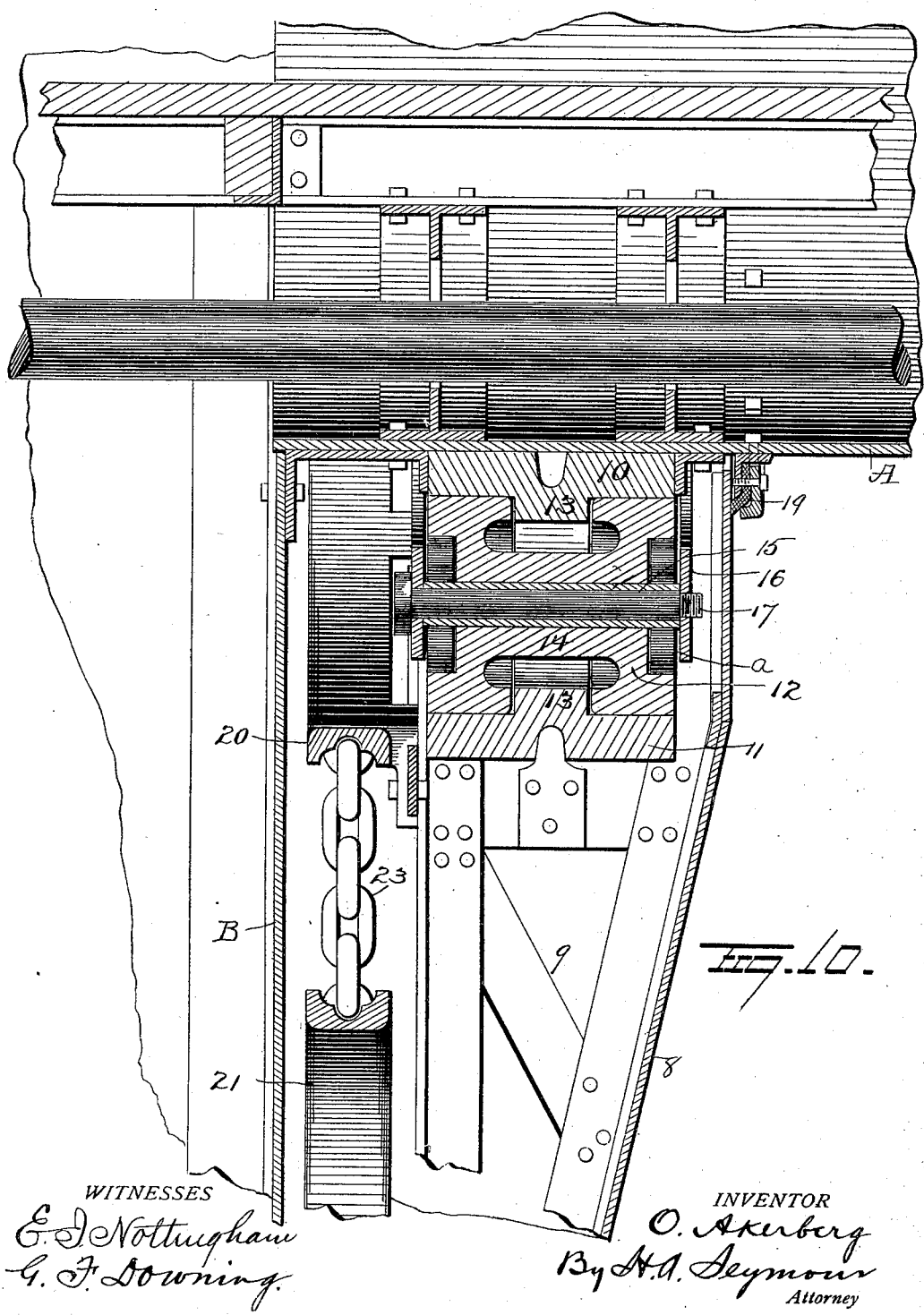

No. 639,334. Patented Dec. 19, 1899.
O. AKERBERG.
SHIP.
(Application filed Apr. 17, 1899.)
(No Model.) 8 Sheets—Sheet 1.
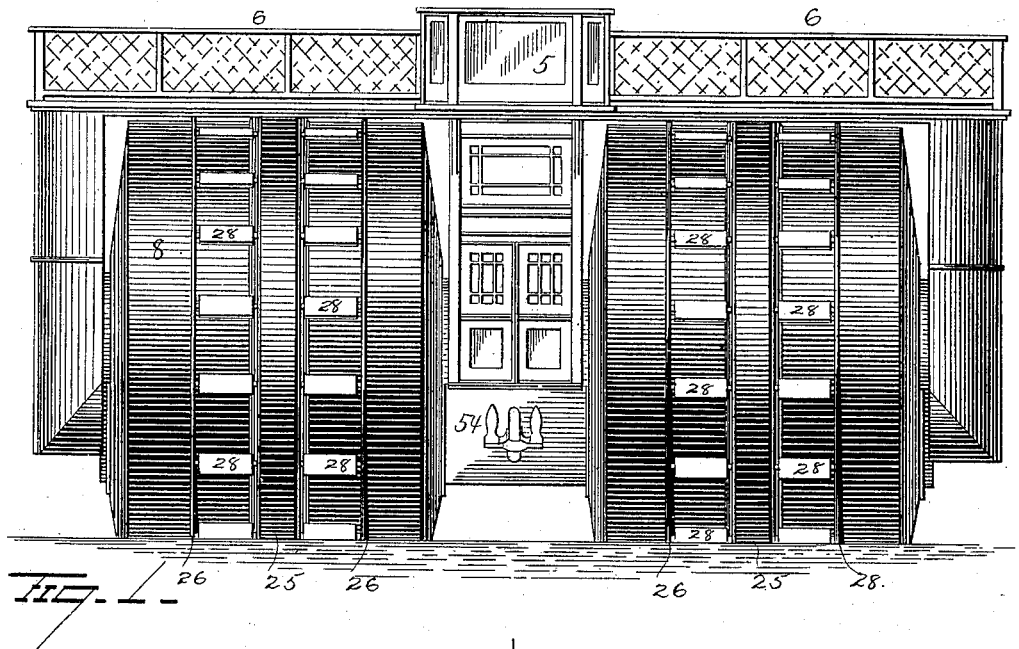
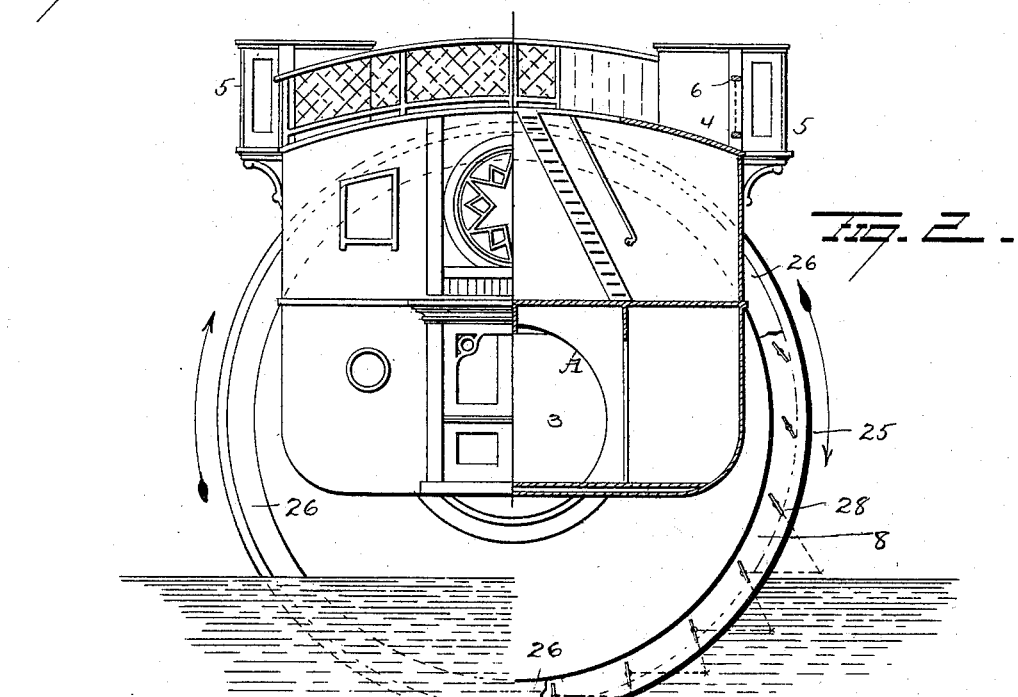

No. 639,334. Patented Dec. 19, 1899.
O. AKERBERG.
SHIP.
(Application filed Apr. 17, 1899.)
(No Model.) 8 Sheets—Sheet 2.
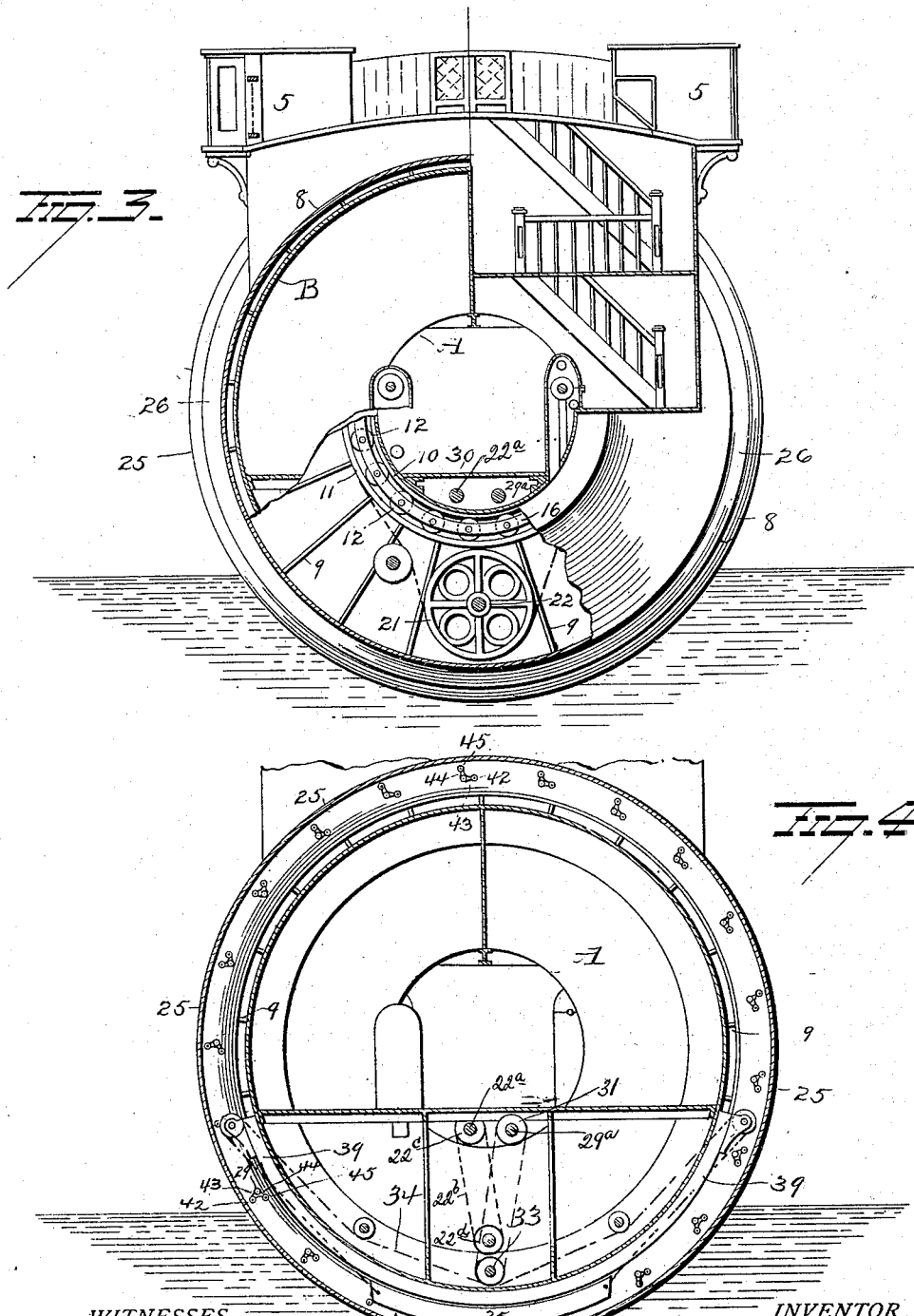

No. 639,334. Patented Dec. 19, 1899.
O. AKERBERG.
SHIP.
(Application filed Apr. 17, 1899.)
(No Model.) 8 Sheets—Sheet 3.
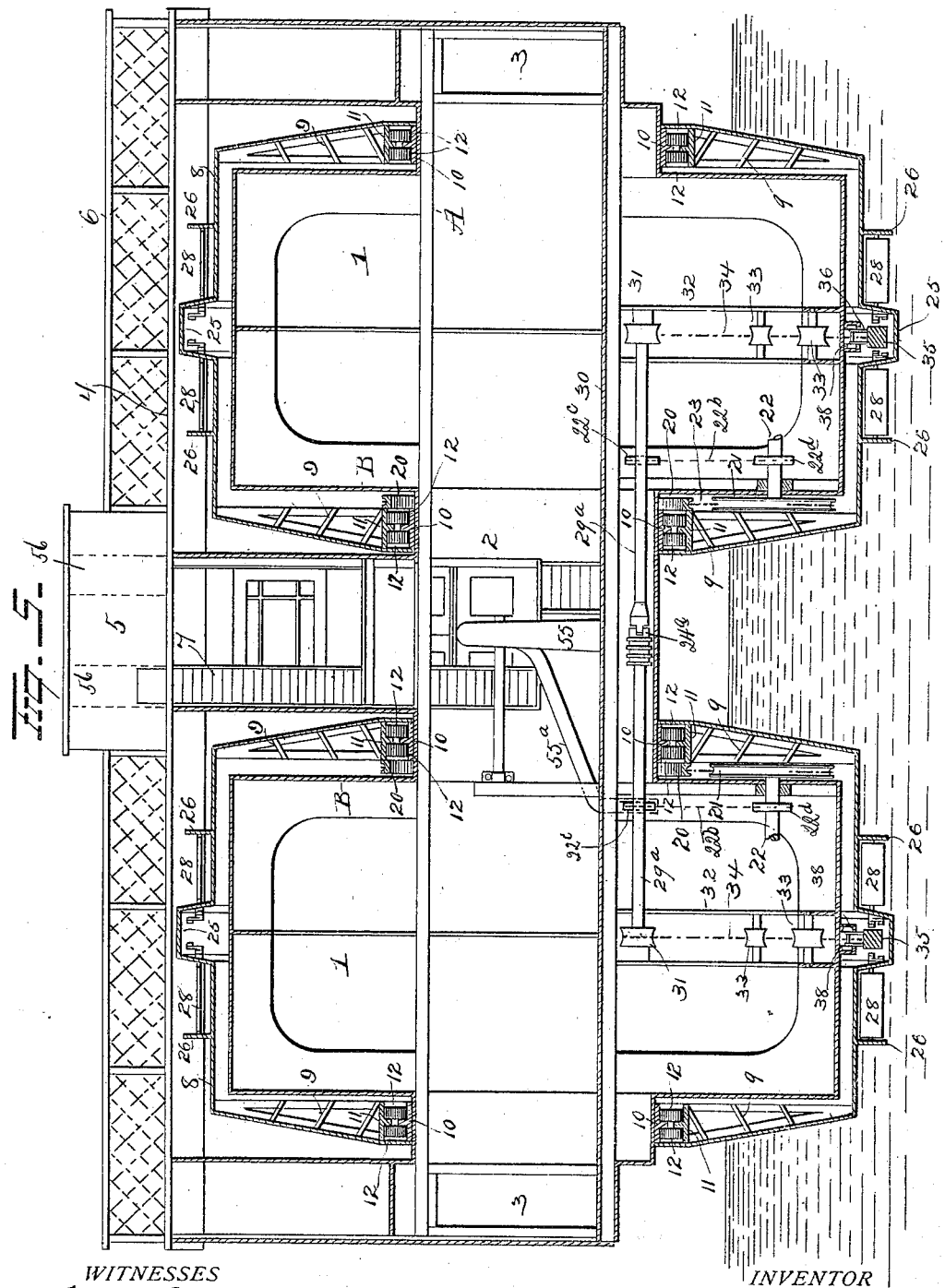

No. 639,334. Patented Dec. 19, 1899.
O. AKERBERG.
SHIP.
(Application filed Apr. 17, 1899.)
(No Model.) 8 Sheets—Sheet 4.
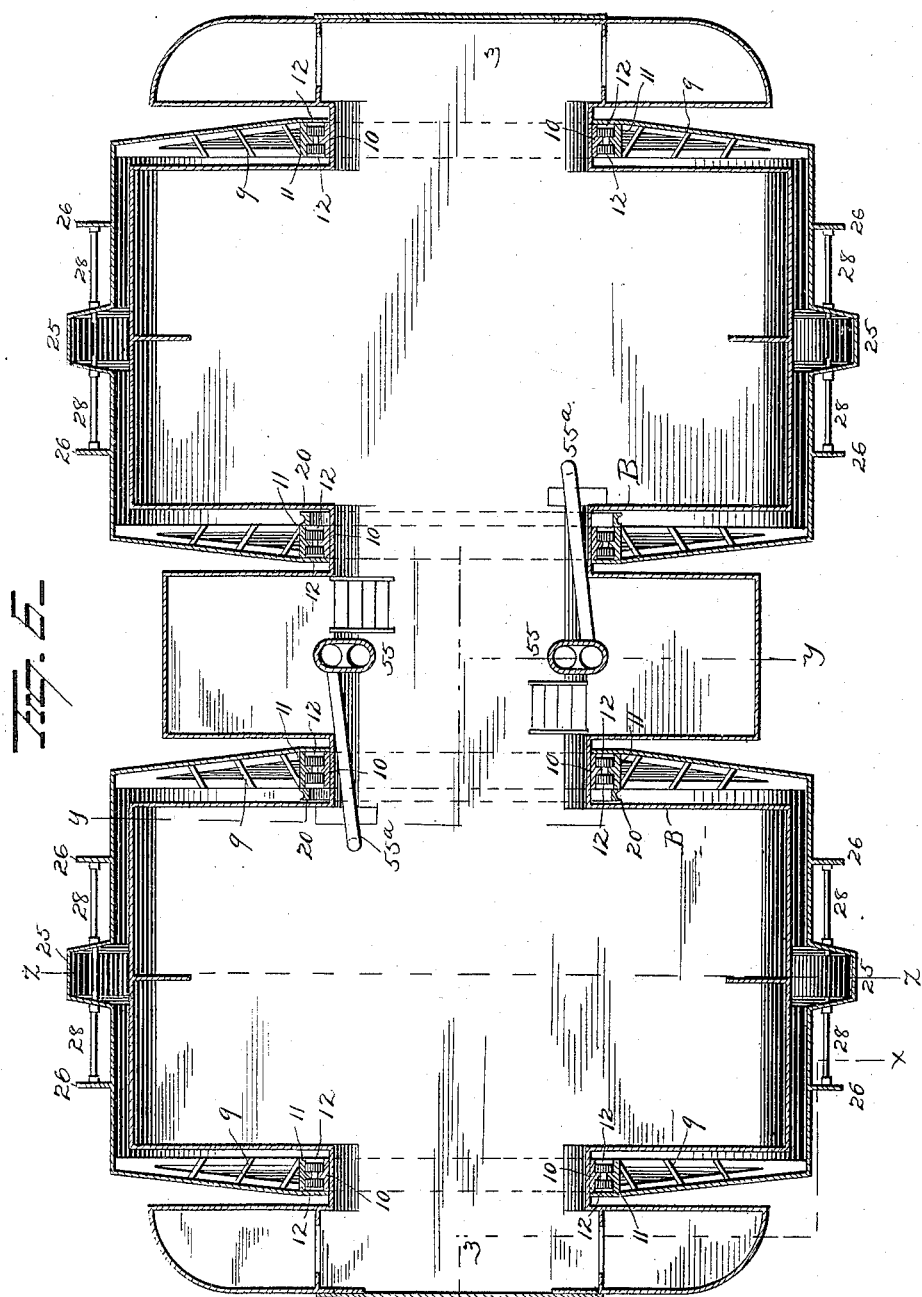
WITNESSES
E. D. Nottingham
G. F. Downing
INVENTOR
O. Akerberg
By H. A. Seymour
Attorney No. 639,334. Patented Dec. 19, 1899.
O. AKERBERG.
SHIP.
(Application filed Apr. 17, 1899.)
(No Model.) 8 Sheets—Sheet 5.
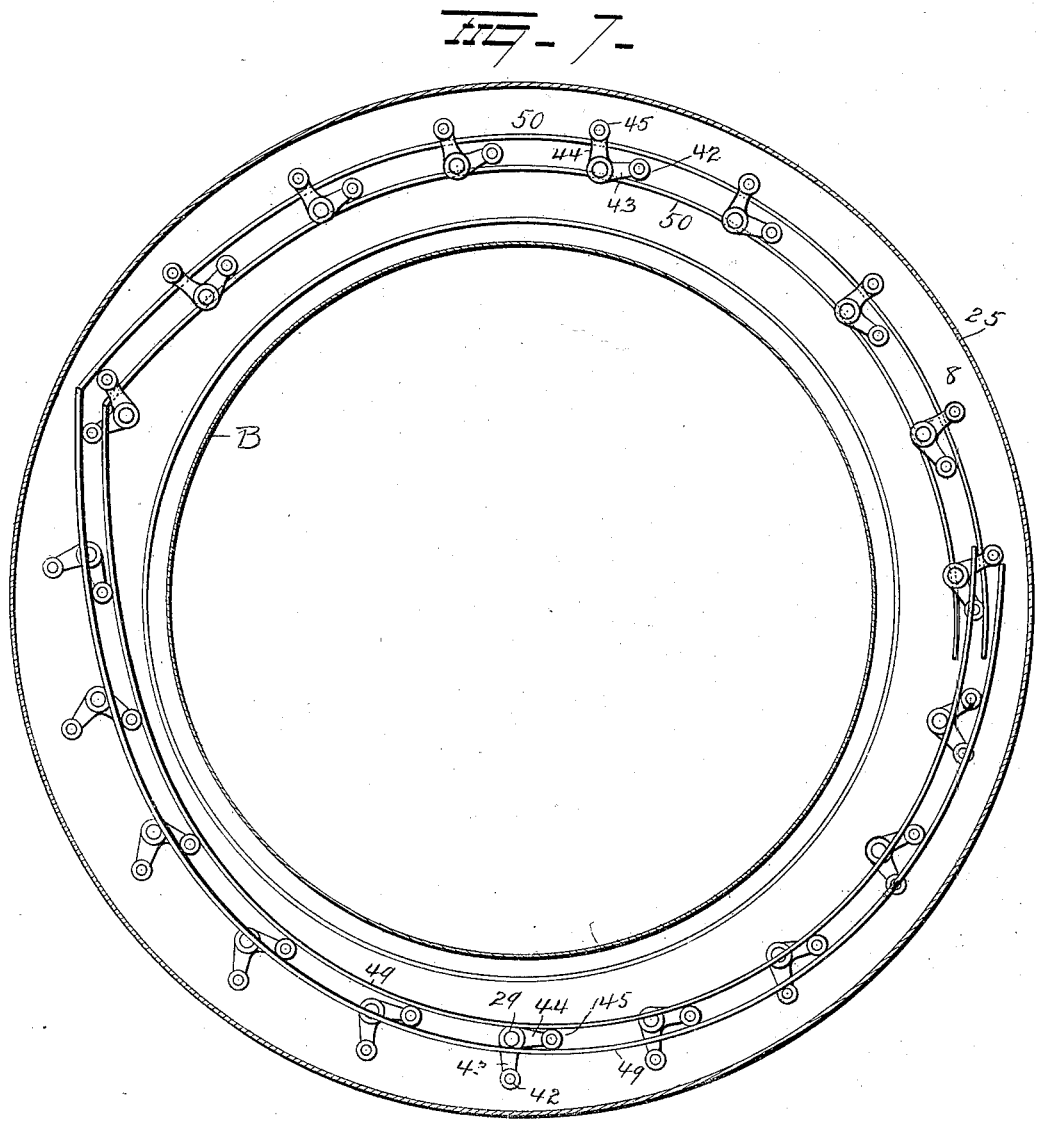
WITNESSES
INVENTOR No. 639,334. Patented Dec. 19, 1899.
O. AKERBERG.
SHIP.
(Application filed Apr. 17, 1899.)
(No Model.) 8 Sheets—Sheet 6.
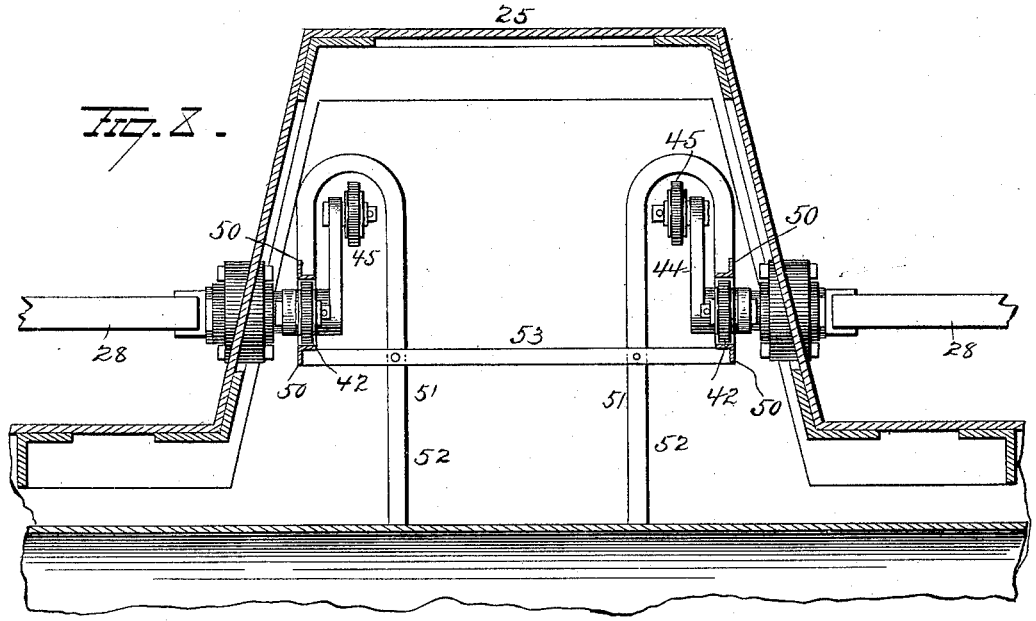
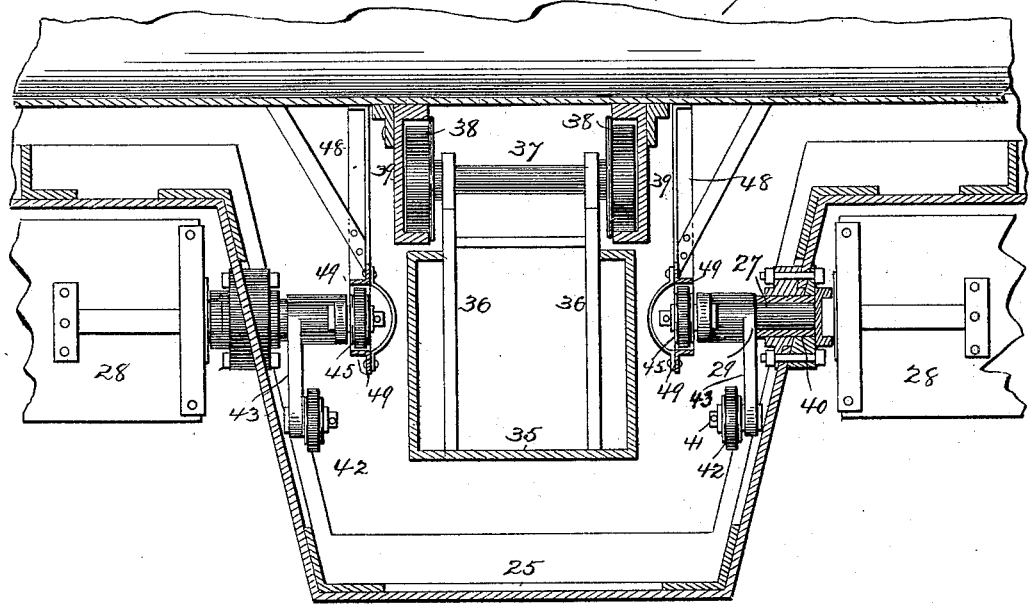
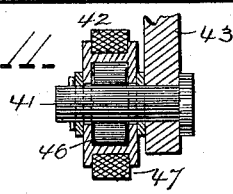
WITNESSES
E. J. Nottingham
G. F. Downing
INVENTOR
O. Akerberg
By H. A. Seymour
Attorney No. 639,334.  Patented Dec. 19, 1899.
O. AKERBERG.
SHIP.
(Application filed Apr. 17, 1899.)
(No Model.) 8 Sheets—Sheet 7.

WITNESSES
INVENTOR
O. Akerberg
By H. A. Seymour
Attorney

No. 639,334. Patented Dec. 19, 1899.
O. AKERBERG.
SHIP.
(Application filed Apr. 17, 1899.)
(No Model.) 8 Sheets—Sheet 8.
Fig. 12.
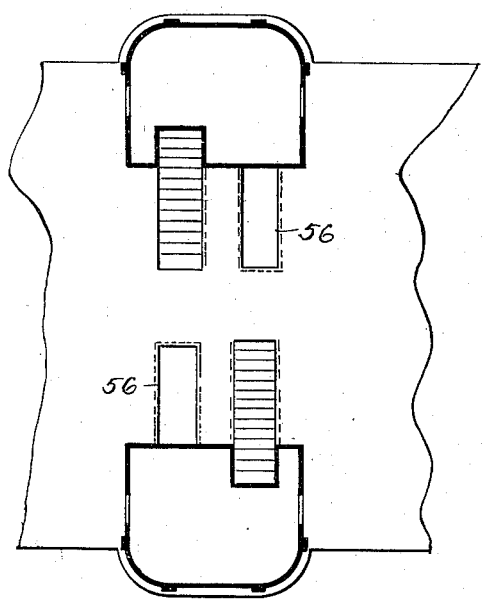
Fig. 13.
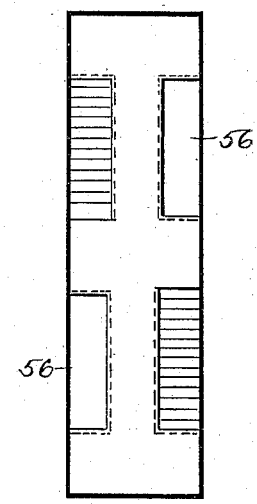
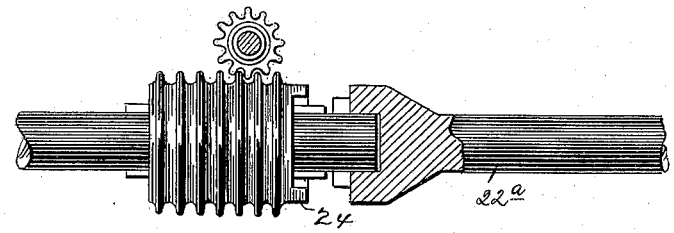
Fig. 14.
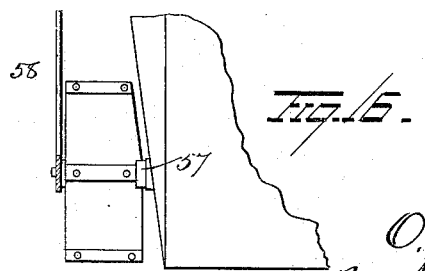
Fig. 15.
WITNESSES
E. J. Nottingham
G. F. Downing
INVENTOR
O. Akerberg
By H. A. Seymour
Attorney
THE NORRIS PETERS CO., PHOTO-LITHO., WASHINGTON, D. C.

UNITED STATES PATENT OFFICE.

OLOF AKERBERG, OF BURLINGTON, IOWA, ASSIGNOR OF ONE-FOURTH TO NILS ANDERSON, OF SAME PLACE.

SHIP.

SPECIFICATION forming part of Letters Patent No. 639,334, dated December 19, 1899.

Application filed April 17, 1899. Serial No. 713,347. (No model.)

*To all whom it may concern:*

Be it known that I, OLOF AKERBERG, a resident of Burlington, in the county of Des Moines and State of Iowa, have invented certain new and useful Improvements in Ships; and I do hereby declare the following to be a full, clear, and exact description of the invention, such as will enable others skilled in the art to which it appertains to make and use the same.

My invention relates to an improvement in ships, the object of the invention being to provide a ship which can be propelled so as to cause it to roll on the water.

A further object is to so construct a ship that the interior thereof will remain rigid while the outer shell or casing revolves to propel the ship.

A further object is to so construct a ship that the outer shell can revolve around the inner casing or shell and be propelled by mechanism in the inner casing or shell.

A further object is to provide a ship which will be comparatively simple in construction and which can be operated to develop a great amount of speed.

With these objects in view the invention consists in certain novel features of construction and combinations and arrangements of parts, as will be more fully hereinafter described, and pointed out in the claims.

In the accompanying drawings, Figure 1 is a front view of my improved ship. Fig. 2 is a side view, partly in section, on the line $x$ $x$ of Fig. 6. Fig. 3 is a view in vertical transverse section on the line $y$ $y$ of Fig. 6. Fig. 4 is a view in vertical transverse section through one of the rotating shells on the line $z$ $z$ of Fig. 6. Fig. 5 is a view in vertical longitudinal section. Fig. 6 is a view in longitudinal horizontal section. Fig. 7 is an enlarged sectional view showing the paddle-operating mechanism. Figs. 8 and 9 are enlarged sectional views illustrating the paddle-operating mechanism. Fig. 10 is an enlarged sectional view showing the operating mechanism for revolving the outer shell or casing. Figs. 11, 12, 13, and 14 are views of details, and Fig. 15 is a view of a modified form of my invention.

A represents a cylindrical horizontally-disposed chamber, having a casing B secured thereto. The casing B comprises two enlarged circular chambers 1 1 and central upright chamber 2 and end upright chambers 3 3. The central upright chamber 2 and end chambers 3 3 communicate at their upper ends with a deck 4, having a pilot-house 5 thereon and provided with any suitable railing 6. Any suitable stairways 7 may be provided in the upright passages 2 and 3 to communicate with the interior of the ship.

Outer casings 8 are disposed around the chambers 1 and are beveled, inclined, or bulged on their sides and provided with a reinforcing-frame 9. The contracted portions of the inner casing are provided at points inside the outer casing with tracks or rings 10, and the outer casing is also provided with a track 11 around the tracks 10, and suitable rollers 12 are disposed between said tracks. The tracks 10 and 11 are provided with central beads 13, and the rollers 12 are provided with central grooves 14 to receive the beads 13 on the tracks. Each roller 12 is provided with a longitudinal hole or opening, in which a sleeve 15 is disposed. A ring 16 is disposed around each side of the rollers 12, and each ring is provided with holes in alinement with the sleeves 15 for the reception of bolts 17 passing through said sleeves and rings and revolubly holding the rollers in position at a predetermined distance apart. Any suitable packing 19 may be provided between the inner edges of the outer casing and the contracted chambers to prevent the entrance of water between the casings. Suitable antifriction-rollers $a$ are provided for the rollers 12.

A ring or pulley 20 is secured to each inner face of the frame 9 on each outer casing 8 and disposed around the contracted chambers 2, and said pulley 20 is connected with a pulley 21 on a drive-shaft 22, projecting through the side of the inner casing, by a chain 23, so that when the shaft 22 is revolved it will transmit motion to the pulley 20 by means of the pulley 21 and chain 23 to revolve the outer casings and propel the ship.

The drive-shafts 22 may be operated by any desired engine or engines located in the bottom of the enlarged chambers, and said shafts may be coupled together by clutch-sections 24, as shown in Fig. 14, to operate both of said shafts simultaneously and at the same rate of speed and to enable the shafts to be uncoupled when it is desired to turn the ship by revolving one outer casing in one direction and the other casing in the opposite direction. The clutch 24 is located between the sections of a shaft 22ᵃ, disposed parallel with the shaft 29ᵃ, and said shaft 22ᵃ is connected with the shaft 22 by means of belts 22ᵇ and pulleys 22ᶜ 22ᵈ.

Each outer casing is provided centrally around its periphery with an outwardly-projecting chamber or keel 25, and on each side of said keels peripheral flanges 26 are secured around said casings. The keel 25 and flanges 26 are each provided with a series of alining holes or openings for the reception of trunnions 27 on the ends of horizontally-disposed paddles 28. The trunnions projecting through the keel of each outer casing are provided with suitable bell-crank levers 29, for a purpose more fully hereinafter explained.

A shaft 29ᵃ is disposed horizontally in the inner casing beneath the main deck 30 and is provided on each end with a pulley 31. A frame 32 is provided in the inner enlarged chambers, in which suitable pulleys 33 are mounted, and a suitable chain or cord 34 is disposed around said pulleys 33 and is connected at its respective ends with the respective ends of a balance-weight 35 below the inner casing and disposed in the keel 25. The intermediate portion of each cord or chain 34 passes over the respective pulleys 31 on the shaft 29ᵃ. Each balance-weight 35 is provided with an upwardly-projecting frame 36, carrying shafts 37, on the ends of which are mounted wheels 38, adapted to turn in oppositely-disposed channel rails or tracks 39, secured to the under face of the enlarged chambers.

Each counterweight 35 may be composed of a solid piece of metal or may comprise a box or receptacle adapted to contain suitable weights, as clearly shown in Fig. 9.

It will be seen that both counterweights are connected together by the shaft 29ᵃ and chains 34 and that when one weight will be moved by the motion of the ship to one position the other weight will be moved to the same position, and hence right the ship.

If desired, the two weights may be permitted to operate independently by providing a clutch 24ᵃ (similar to clutch 24) between sections of the shaft 29ᵃ.

The mechanism for operating the bell-crank levers 29 and paddles 28 heretofore referred to is precisely the same for each outer casing, and hence it will be necessary to describe the operating mechanism in connection with but one outer casing.

The openings in the keel 25 for the passage of the trunnions 27 are provided with any approved packing 40, and the ends of the bell-crank levers 29 are provided with pins or bolts 41, passing therethrough, and on an arm 43 of said bell-crank lever is revolubly mounted a pulley 42 and on the other arm 44 of said bell-crank levers is revolubly mounted a pulley 45. The pulleys 42 and 45 are disposed in different vertical planes, as clearly shown in Figs. 7, 8, and 9, and said pulleys are provided with antifriction-bearings 46 and cushioned periphery 47, as clearly shown in Fig. 11.

A frame 48 projects outwardly from and is secured to the enlarged inner casing at its lower half section and a semicircular double cam-track 49 is secured to said frame for the reception of the pulley 45, and it will be seen that when the pulley 45 is held in position by the track 49 the paddles will be held in a vertical position, as shown in Fig. 9, to permit the same to enter the water with their sharp edge in contact therewith, and as the outer casing revolves the flat side of the paddles will bear against the water and propel the ship, and as the paddles come out of the water they will be in a vertical position and give practically no resistance to the water.

A semicircular double cam-track 50 is mounted in a suitable frame 51 on the upper portion of the inner casing, and said track is disposed out of alinement with the lower track 49, so that when the paddles pass a predetermined point in their revolution the pulleys 42 will engage the track or cam 50 and turn the paddles to a horizontal position, as shown in Fig. 8, and the paddles will be held in this position until the track 49 again engages the pulley 45 and turns the paddles to a vertical position for entering the water.

The frame 51 above referred to comprises a series of uprights 52, having outwardly and downwardly curved ends connected by a cross-arm or brace 53, as shown, for strengthening the same.

An anchor-support 54 is provided on the front of the central chamber and the anchor-chain (not shown) is adapted to be wound up by a windlass 55 and passed through a suitable tubing 55ᵃ to the bottom of one enlarged compartment or chamber.

Suitable smoke-stacks 56 are provided for carrying off the smoke from the engines, (not shown,) any of the well-known forms of engines being used to propel the ship.

Instead of providing the paddles beside the keel I might construct same as shown in Fig. 15. In this form of my invention the paddles are made narrow and disposed on shafts or pintles 57, projecting through the side of the outer casing. The outer ends of said shafts or pintles are disposed in bearings in a ring 58, extending entirely around the outer casing. The shafts or pintles 57 are operated by bell-crank levers and track-sections, as heretofore described in connection with the preferred form of my invention.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a ship, the combination with an inner casing or body, of an outer casing revolubly mounted on the inner casing or body, anti-friction-bearings between the inner and outer casings, a pulley secured to the outer casing, a pulley mounted on a shaft projecting from the inner casing and means for connecting said pulleys for transmitting motion from the shaft to the outer casing to revolve the latter.

2. In a ship, the combination with an inner casing having contracted ends and central portions and enlarged between said contracted portions, of a revoluble casing around each of said enlarged portions and means in each of said enlarged portions for revolving the casing around the same and a deck mounted on the contracted portions and extending over the enlarged portions.

3. In a ship, the combination with a body portion, of a revoluble casing around said body portion having a peripheral enlargement therein to form a keel, and a balance-weight movably connected with the body portion and disposed in the keel.

4. In a ship, the combination with a body portion, of a revoluble casing around said body portion having a peripheral enlargement thereon to form a keel, a peripheral flange around said casing on each side of the keel, means in the keel for feathering the paddles and means in the body portion for revolving the casing.

5. In a ship, the combination with a body portion, of a casing revolubly mounted on said body portion, paddles mounted on the outside of the casing having trunnions on one end projecting into said casing, bell-crank levers having rollers at the end of each arm, secured on the inner ends of the trunnions, and cam-tracks secured to the body portion to receive the rollers on the bell-crank levers to feather the paddles as they enter the water.

6. In a ship, the combination with a body portion having enlarged chambers and a small chamber connecting the enlarged chambers, a casing revolubly mounted on each enlarged casing, counterweights disposed between the enlarged chambers and casings mounted to move on tracks on the enlarged chambers, a cord or chain connected to the counterweights and passing around a pulley, a shaft connecting said pulleys so as to compel the counterweights to move simultaneously.

7. In a ship, the combination of revoluble propelling-wheels, a saloon mounted therein, a deck disposed over the saloon and propeller-wheels and supported at its ends by the saloon and communicating means between the saloon and the deck.

In testimony whereof I have signed this specification in the presence of two subscribing witnesses.

OLOF AKERBERG.

Witnesses:
NILS ANDERSON,
C. C. FOWLER.